United States Patent
Downing et al.

(10) Patent No.: US 10,377,292 B2
(45) Date of Patent: Aug. 13, 2019

(54) HOIST MECHANISM LOCKING ASSEMBLY (71) Applicant: Wastequip LLC, Charlotte, NC (US)

(72) Inventors: John Jason Downing, Winamac, IN (US); Nicholas Stephen Franiak, Francesville, IN (US); Gary Stanley, Camden, IN (US)

(73) Assignee: Wastequip, LLC, Charlotte, NC (US)

( * ) Notice: Subject to any disclaimer, the term of this patent is extended or adjusted under 35 U.S.C. 154(b) by 148 days.

(21) Appl. No.: 15/674,219

(22) Filed: Aug. 10, 2017

(65) Prior Publication Data

US 2019/0047459 A1    Feb. 14, 2019

(51) Int. Cl.
*B60P 1/16*    (2006.01)
*B60P 1/48*    (2006.01)

(52) U.S. Cl.
CPC .............. *B60P 1/483* (2013.01); *B60P 1/16* (2013.01)

(58) Field of Classification Search
CPC ....... B60P 1/283; B60P 1/6463; B60P 1/6409; B60P 1/483; B60P 1/16
See application file for complete search history.

(56) References Cited

U.S. PATENT DOCUMENTS

| | | | |
|---|---|---|---|
| 3,892,323 A * | 7/1975 | Corompt | B60P 1/6463 414/491 |
| 4,111,321 A * | 9/1978 | Webster | B60P 1/6463 414/549 |
| 4,204,793 A * | 5/1980 | Lemaire | B60P 1/6463 414/421 |
| 4,453,878 A * | 6/1984 | Paukku | B60P 1/6463 414/421 |
| 5,088,875 A | 2/1992 | Galbreath et al. | |
| 5,531,559 A * | 7/1996 | Kruzick | B60P 1/283 414/498 |
| 5,542,807 A | 8/1996 | Kruzick | |
| 5,601,393 A * | 2/1997 | Waldschmitt | B60P 1/16 414/471 |
| 7,278,816 B2 * | 10/2007 | Marmur | B60P 1/6463 414/491 |
| 7,341,419 B1 * | 3/2008 | Fink | B60P 1/6463 414/448 |
| 7,726,930 B2 * | 6/2010 | Simpson | B60P 1/6463 414/491 |
| 8,021,096 B2 * | 9/2011 | Railsback | B60P 1/6463 414/477 |

(Continued)

*Primary Examiner* — Kaitlin S Joerger
(74) *Attorney, Agent, or Firm* — Nelson Mullins Riley & Scarborough LLP (57) ABSTRACT

A hoist mechanism having an improved locking assembly. A hoist mechanism includes a frame including a first end and a second end, and the frame is pivotably coupled with a mounting structure at the frame first end. The hoist mechanism also includes a hoist arm assembly pivotably coupled with the frame second end, and the hoist arm assembly includes a jib operative to move between an extended position and a retracted position. The locking assembly includes a lug disposed on the jib and a link arm coupled with the frame. The link arm defines a slot dimensioned to selectively engage with the lug when the jib is moved from the retracted position. The hoist arm assembly is pivotable with respect to the frame when the jib is in the retracted position, and the frame and the hoist arm assembly are pivotable together when the jib is in the extended position.

20 Claims, 6 Drawing Sheets

(56) References Cited

U.S. PATENT DOCUMENTS

| | | | | |
|---|---|---|---|---|
| 8,215,892 B2* | 7/2012 | Calliari | ............... | B60P 1/6463 |
| | | | | 414/469 |
| 8,465,246 B2* | 6/2013 | Duell | .................. | B60P 1/6463 |
| | | | | 414/480 |
| 9,227,546 B2* | 1/2016 | Marmur | ............... | B60P 1/6463 |
| 10,131,264 B2* | 11/2018 | Sailer | .................. | B60P 1/6463 |
| 2007/0237617 A1* | 10/2007 | Schroeder | ............ | B60P 1/6463 |
| | | | | 414/491 |
| 2011/0196623 A1* | 8/2011 | Hakkinen | ............ | B60P 1/6463 |
| | | | | 702/41 |
| 2013/0230374 A1* | 9/2013 | Kerkvliet | ............ | B60P 1/6463 |
| | | | | 414/477 |

* cited by examiner

HOIST MECHANISM LOCKING ASSEMBLY

FIELD OF THE INVENTION

The present invention relates generally to hoist mechanisms and, in some embodiments, to vehicles comprising hoist mechanisms operative to load containers thereon, unload containers therefrom, transport the containers, and empty the containers. More particularly, embodiments of the present invention relate to an improved locking assembly for a hoist mechanism.

BACKGROUND

Vehicles, such as trucks, comprising hoist mechanisms for on-loading, off-loading, transporting, and dumping containers are known. One type of hoist mechanism that is commonly used is known as a "hook hoist." A hook hoist may typically include an L-shaped hoist arm that is pivotally mounted to a tilt frame on the rear of the vehicle trailer or chassis. Part of the arm, often referred to as a "jib," may be telescopically extendable and have a hook mounted to the outboard end thereof configured to engage with a transportable container. The tilt frame is itself pivotally mounted to the rear end of the vehicle chassis or sub-frame. One or more hydraulic cylinders are usually connected between the vehicle chassis or sub-frame and the hoist arm. Typically, the hook hoist mechanism will include a locking system operative to lock the hoist arm to the tilt frame and unlock the hoist arm from the tilt frame. Thus, when the hoist arm is not locked to the tilt frame, the hydraulic cylinder(s) can be actuated to pivot the hoist arm about its pivotal connection with the tilt frame, which may remain stationary. Often, the hoist arm can be pivoted toward the rear of the vehicle approximately 150° so that it may engage with a container and then be pivoted back, thereby lifting the container up onto the vehicle chassis. Subsequent extension of the jib may pull the container toward the front of the vehicle to a desired transport position. When the tilt frame is locked with the hoist arm, however, the hydraulic cylinder(s) can be actuated to pivot the tilt frame and hoist arm together as a unit about the pivotal mount between the tilt frame and the vehicle chassis or sub-frame. This action allows the operator to dump a container that is connected with the hook hoist on the vehicle.

As is known, if the system locking the hoist arm to the tilt frame becomes disengaged or otherwise breaks while the hoist arm and tilt frame are pivoted upwardly with a container, the whole assembly may come crashing down, likely causing considerable damage to the vehicle, hook hoist, and/or container. Various safety mechanisms have been designed to prevent this occurrence. Additional background regarding vehicle mounted hook hoists is provided in U.S. Pat. Nos. 5,542,807; 5,531,559; and 5,088,875, the entire disclosures of which are incorporated herein by reference for all purposes.

SUMMARY

According to one embodiment, the present invention comprises a hoist mechanism. The hoist mechanism comprises a mounting structure and a frame comprising a first end and a second end. The frame is pivotably coupled with the mounting structure at the frame first end. The hoist mechanism further comprises a hoist arm assembly comprising a sleeve pivotably coupled with the frame second end and a jib coupled with the sleeve. The jib is operative to move between an extended position and a retracted position with respect to the sleeve. Also, the hoist mechanism comprises a locking assembly operative to move between an unlocked position, wherein the hoist arm assembly is pivotable with respect to the frame about the pivotal connection between the frame second end and the hoist arm assembly, and a locked position, wherein the frame and the hoist arm assembly are releasably coupled for unitary pivotal movement about the pivotal connection between the frame first end and the mounting structure. The locking assembly comprises a lug disposed on the jib of the hoist arm assembly and a link arm coupled with the frame. The lug is operative to move with the jib between the extended and retracted positions, and the link arm defines a first slot operative to engage with the lug when the jib is moved from the retracted position.

In another embodiment, the present invention comprises a hoist mechanism. The hoist mechanism includes a frame comprising a first end and a second end, and the frame is pivotably coupled with a mounting structure at the frame first end. The hoist mechanism also includes a hoist arm assembly pivotably coupled with the frame second end, and the hoist arm assembly includes a jib operative to move between an extended position and a retracted position. The locking assembly includes a lug disposed on the jib and a link arm coupled with the frame. The link arm defines a slot dimensioned to selectively engage with the lug when the jib is moved from the retracted position. The hoist arm assembly is pivotable with respect to the frame when the jib is in the retracted position, and the frame and the hoist arm assembly are pivotable together when the jib is in the extended position.

Those skilled in the art will appreciate the scope of the present invention and realize additional aspects thereof after reading the following detailed description of example embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

DETAILED DESCRIPTION OF PREFERRED EMBODIMENTS

Reference will now be made in detail to various embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Although as noted above there have been attempts to provide an effective locking system for locking and unlocking a hoist arm and a tilt frame in prior art vehicle-mounted hook hoists, these previous attempts suffer from a number of drawbacks. Many attempted solutions involve complex and cumbersome devices that are expensive, difficult to manufacture, and prone to failure. For instance, one prior art locking system includes, among other components, spring-loaded latches and a spring-biased link, connecting elements, and a pushpost coupled with the hoist arm assembly. Systems such as these that involve many parts may be susceptible to alignment issues and may easily become stuck in the locked position.

Embodiments of the present invention provide an improved locking system for a hoist mechanism, which may (but need not) be mounted to a chassis or a sub-frame of a vehicle. According to one embodiment, the hoist mechanism may comprise a hoist arm assembly and a tail frame coupled with a vehicle. A locking assembly may comprise a locking lug coupled with a telescoping jib of a hoist arm assembly and a link arm coupled with the tail frame. The locking lug may positively engage the link arm when the jib is moved to a predetermined position. Thereby, the hoist arm assembly and the tail frame may pivot together as a unit to an elevated position to dump the contents of a container. Although some preferred embodiments are discussed below in the context of vehicle-mounted hook hoists, those of skill in the art will appreciate that the present invention is not so limited. In particular, it is contemplated that embodiments of the present invention may be used with hoist mechanisms other than hook hoists, and embodiments of the invention may be used with hoist mechanisms on vehicles other than trucks, or on hoist mechanisms that are not mounted on vehicles at all.

Figure 1:
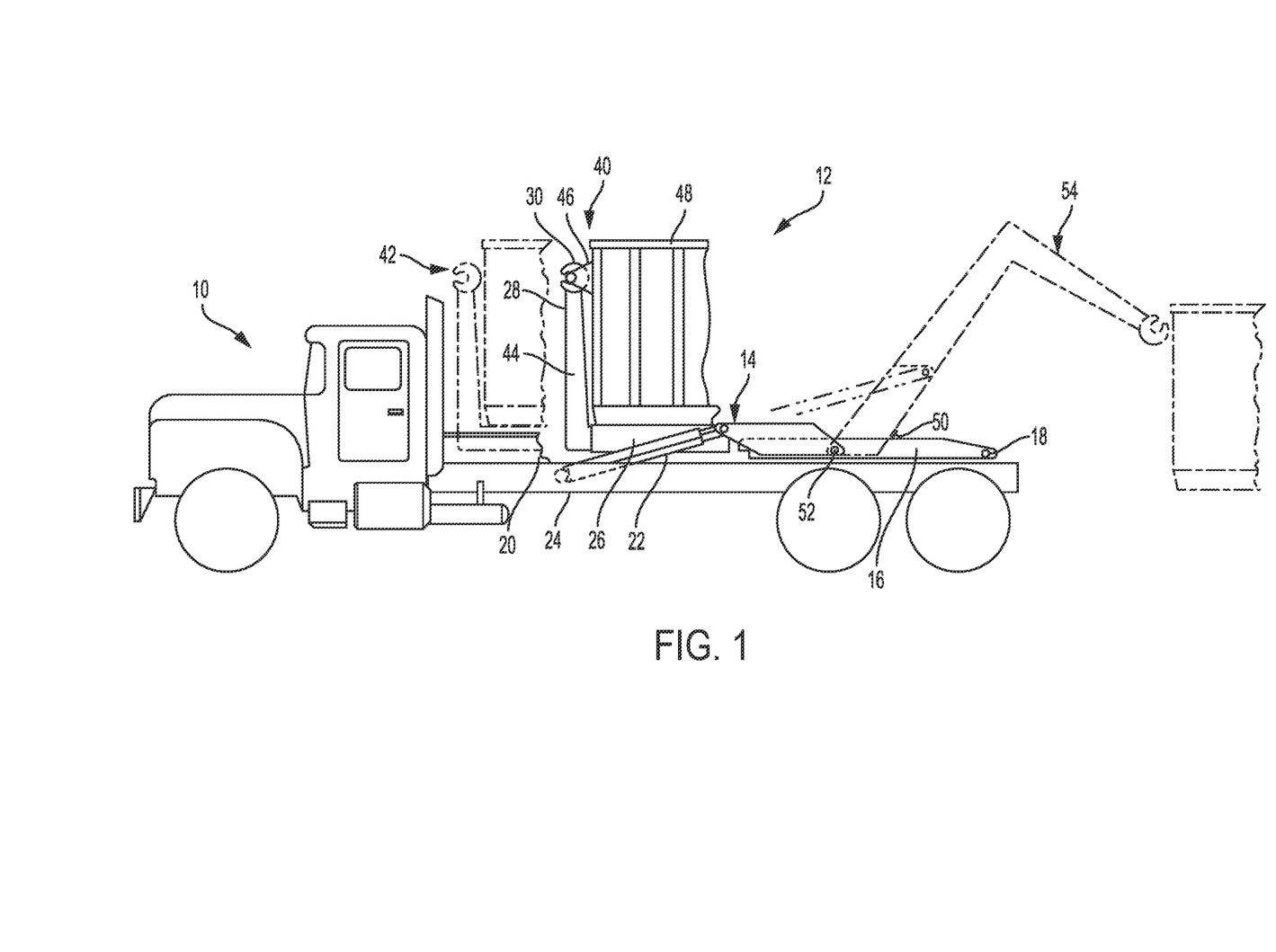
FIG. 1 is a diagrammatic side elevation of a vehicle including a hoist mechanism with which embodiments of the present invention may be used.
Figure 2:
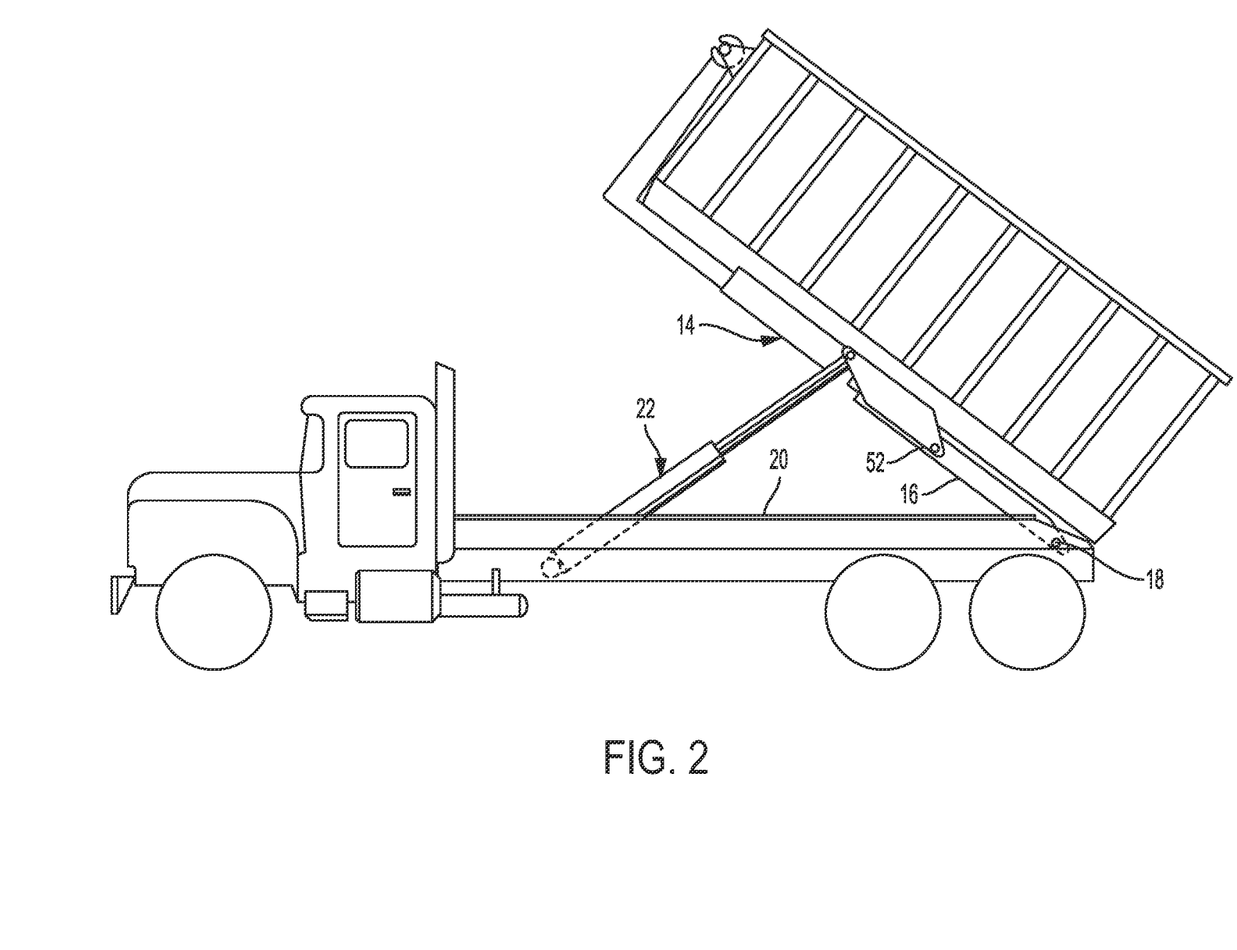
FIG. 2 is a diagrammatic side elevation of the vehicle of FIG. 1 wherein the hoist arm assembly and tail frame are locked together and pivoted to an elevated position about the pivotal connection between the tail frame and the vehicle sub-frame.
Figure 3:
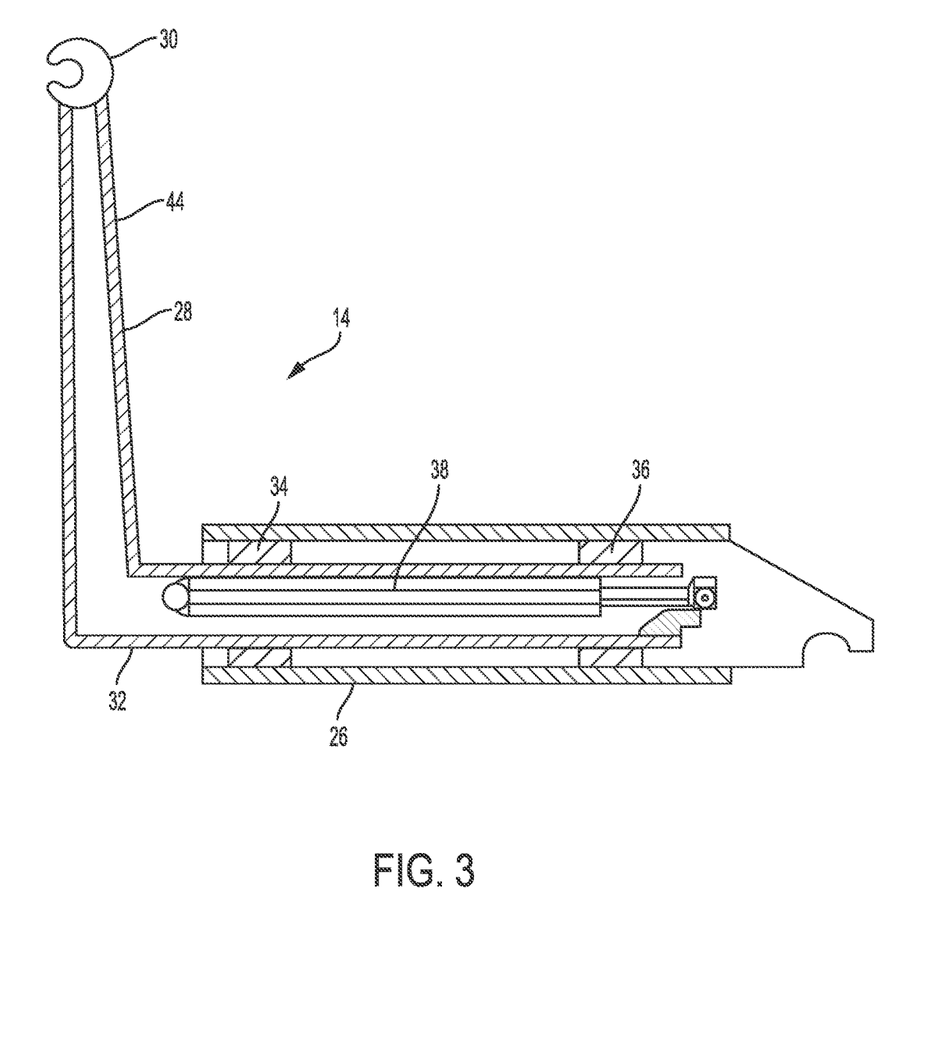
FIG. 3 is a diagrammatic cross-sectional view of the hoist arm assembly of the vehicle-mounted hoist mechanism shown in FIG. 1.

In this regard, FIG. 1 is a diagrammatic side elevation of a vehicle 10 including a hoist mechanism 12 with which some embodiments of the present invention may be used. FIG. 2 is a diagrammatic side elevation of the vehicle wherein a hoist arm assembly 14 and tail frame 16 are locked together and pivoted to an elevated position about a pivotal connection 18 between the tail frame 16 and the vehicle sub-frame 20. FIG. 3 is a diagrammatic cross-sectional view of the hoist arm assembly 14.

Turning to the figures, hoist mechanism 12 is preferably operably coupled to a sub-frame 20 of a vehicle 10 for pivotal movement about a connection 18 via at least one linear actuator, which may be at least one hydraulic cylinder 22. Sub-frame 20 is mounted to the chassis 24 of vehicle 10 as is known in the art. Hoist mechanism 12 generally includes a hoist arm assembly 14, a tail frame 16, and a locking assembly (not shown in FIGS. 1-3). A locking assembly in accordance with embodiments of the present invention is described in greater detail below. Tail frame 16 is pivotally connected at its rear by pivotal connection 18 to sub-frame 20, as shown in FIGS. 1 and 2.

Hoist arm assembly 14 generally includes a jib sleeve 26 and an L-shaped jib 28 with a hook 30 connected at the outboard end thereof. Jib sleeve 26 has a generally rectangular cross-section and telescopically receives a leg 32 of jib 28 thereby. Four nylon wear pads 34 are mounted on the four interior sides of jib sleeve 26 at its forward end, and four nylon wear pads 36 are mounted on the four exterior sides of leg 32, as shown in FIG. 3, to enhance the telescopic sliding action of leg 32 within sleeve 26. A linear actuator, such as a double acting hydraulic cylinder assembly 38, is connected by a mounting pin at the rear end of jib sleeve 26, and the opposite end of hydraulic cylinder assembly 38 is connected at the forward end of leg 32 in a conventional manner. Cylinder assembly 38 operates to extend and retract jib 28 between a retracted position 40 (as shown in solid lines in FIG. 1) and an extended position 42 (as shown in dotted lines in FIG. 1). Jib 28 further defines an upstanding arm 44 which is generally orthogonal to leg 32 (FIG. 3). Hook 30, which in this embodiment is C-shaped, is connected at the top of arm 44 and is configured to engage with a mating cross bar 46 or similar structure mounted to the front of a container 48.

Tail frame 16 may comprise an angled stop member 50 and a hoist arm assembly pivotal connection 52. The pivotal connection 52 allows the hoist arm assembly 14 to pivot with respect to tail frame 16 when the two are not locked together (as shown in dotted lines in FIG. 1), and the stop member 50 defines the stopping point of the pivotal movement of hoist arm assembly 14 relative to tail frame 16. Additionally, in some cases, hoist arm assembly 14 may be configured to permit extension of jib 28 from retracted position 40 to an extended position which is farther than that indicated at 42 in FIG. 1. Such extension may be used to push a container onto a loading dock when hoist arm assembly 14 is pivoted to the extended position 54 in FIG. 1. Further rearward extension of hoist arm assembly 14 may be achieved by extension of cylinder(s) 22 to pivot tail frame 16 from horizontal after hoist arm assembly 14 has been pivoted to extended position 54. When the tail frame 16 and hoist arm assembly 14 are locked together as described in greater detail herein, the at least one hydraulic cylinder 22 may be actuated to move the hoist arm assembly 14 and tail frame 16 together as a unit from the lowered position shown in FIG. 1 to the elevated position shown in FIG. 2, which may permit dumping of container 48.

Figure 4:
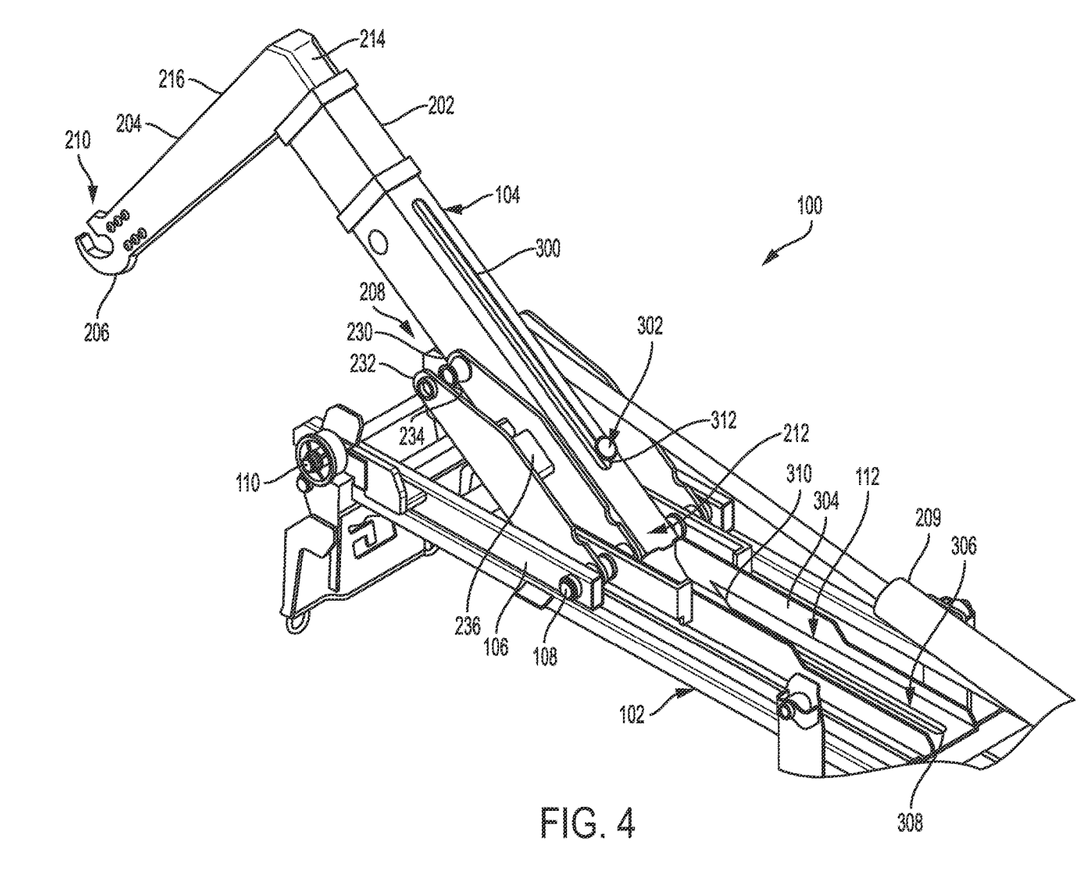
FIG. 4 is a partial front perspective view of a hoist mechanism in accordance with an embodiment of the present invention coupled with a vehicle sub-frame, wherein the hoist arm assembly is not locked with the tail frame and is pivoted to an extended position about its pivotal connection with the tail frame.
Figure 5:
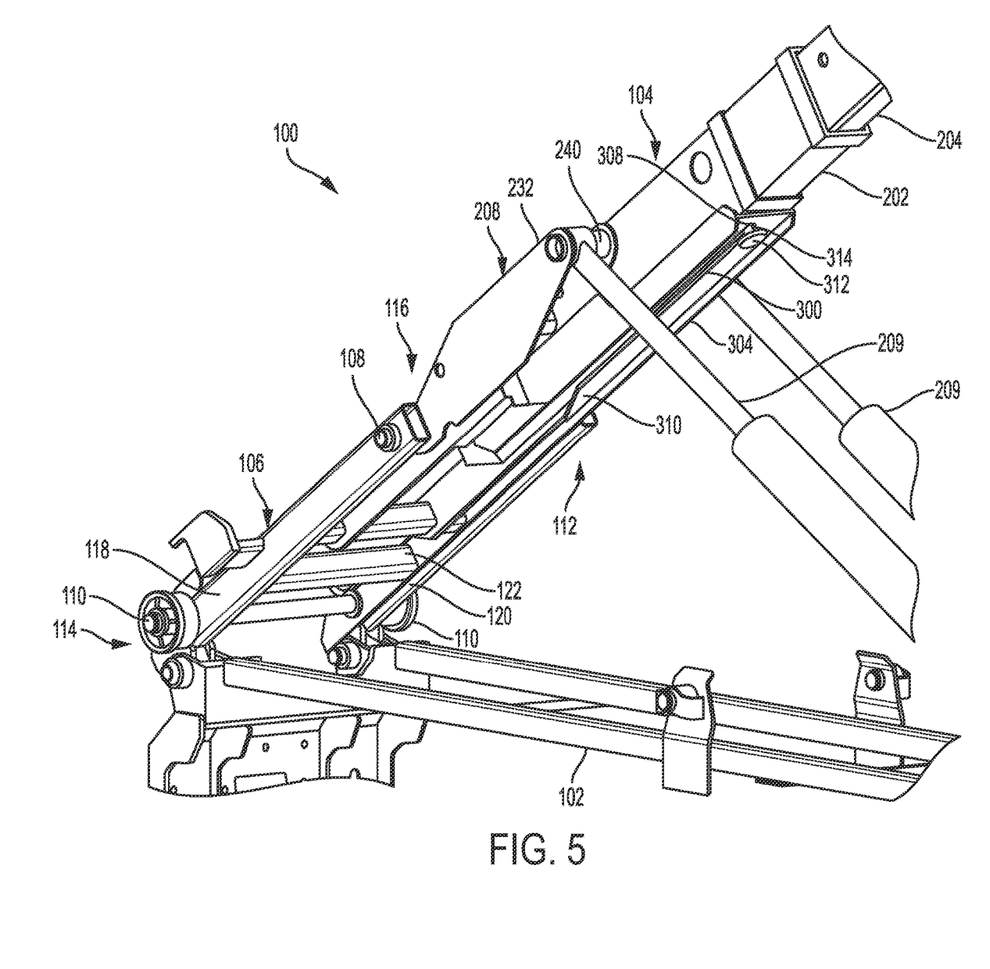
FIG. 5 is a partial perspective view of the hoist mechanism of FIG. 4, wherein the hoist arm assembly is locked with the tail frame and the hoist arm assembly and tail frame are pivoted as a unit to an elevated position about the pivotal connection between the tail frame and the vehicle sub-frame.
Figure 6:
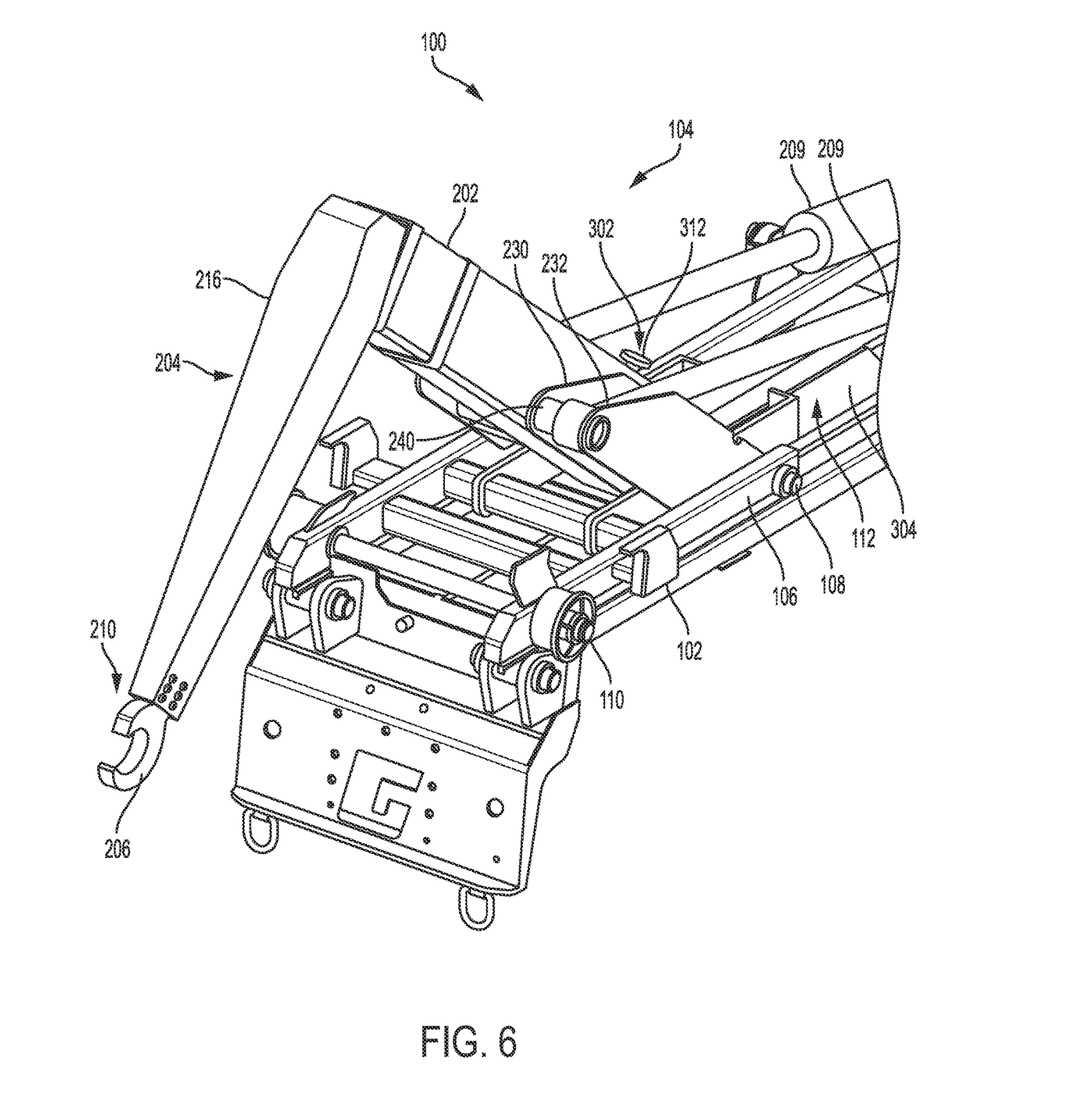
FIG. 6 is a partial rear perspective view of the hoist mechanism of FIG. 4.

FIGS. 4-6 illustrate an exemplary hoist mechanism including a locking assembly in accordance with an embodiment of the present invention. In particular, FIGS. 4-6 are partial perspective views of a hoist mechanism 120 coupled with a vehicle sub-frame 102. It will be appreciated that, in other embodiments, hoist mechanism 120 may be coupled directly with a chassis of a vehicle, rather than a sub-frame thereof, or may not be coupled with a vehicle at all. In FIGS. 4 and 6, a hoist arm assembly 104 of hoist mechanism 120 is not locked with a tail frame 106, and hoist arm assembly 104 is pivoted to an extended position about its pivotal connection 108 with the tail frame 106. In FIG. 5, the hoist arm assembly 104 is locked with the tail frame 106, and the hoist arm assembly 104 and tail frame 106 are pivoted as a unit to an elevated position about the pivotal connection 110 between the tail frame 106 and the vehicle sub-frame 102.

Referring now to FIGS. 4-6, the hoist mechanism 120 preferably comprises a hoist arm assembly 104, a tail frame 106, and a locking assembly 112. The tail frame 106 may have a first end 114 and a second end 116. In some embodiments, the tail frame 106 may include a first frame member 118 and a second frame member 120. The first and second frame members 118, 120 may be operably coupled by one or more cross members 122. The first end 114 of the tail frame 106 may be pivotally connected or otherwise operably coupled by one or more sub-frame pivotal mounts 110 or the like to the sub-frame 102. For example, the first frame member 118 may be pivotally connected by a first sub-frame pivotal mount 110 to the sub-frame 102, and the second frame member 120 may be pivotally connected by a second sub-frame pivotal mount 110 to the sub-frame 102. Furthermore, the second end 116 of the tail frame 106 may be pivotally connected or otherwise operably coupled by one or more pivotal mounts 108 or the like to the hoist arm assembly 104. For example, the first frame member 118 may be pivotally connected by a first pivotal mount 108 to the hoist arm assembly 104, and the second frame member 120 may be pivotally connected by a second pivotal mount 108 to the hoist arm assembly 104.

As discussed above, the hoist mechanism 120 may further include the hoist arm assembly 104. Hoist arm assembly 104, which in some embodiments may preferably be similar to hoist arm assembly 14 described above (except as modified in accordance with embodiments of the present invention), may include a jib sleeve 202 and a jib 204. In the illustrated embodiment, hoist mechanism 120 is a hook hoist, and thus hoist arm assembly 104 may further comprise a hook 206. Hook 206 may be C-shaped and may be configured to engage with a cross bar or similar structure mounted to a transportable container. As described below, one or more braces 208, or another suitable coupling mechanism, may operably connect with one or more linear actuators 209 operative to pivot hoist mechanism 120. The hoist arm assembly 104 may have a first end 210 and a second end 212. The hook 206 of the hoist arm assembly 104 may be located on first end 210 of the hoist arm assembly 104, and the second end 212 of the hoist arm assembly 104 may be pivotally coupled to the tail frame 106 by the one or more pivotal mounts 108, as discussed above. Further, in the illustrated embodiment, jib 204 may be generally L-shaped, and thus it may comprise a leg 214 that is generally orthogonal to an arm 216.

In one embodiment, the jib sleeve 202 may have a substantially rectangular cross-section and be configured to telescopically receive the jib 204. It will be appreciated, however, that sleeve 202 need not be rectangular in cross-section in all embodiments. In some cases, one or more wear pads may be mounted or otherwise operably coupled to an interior side of the jib sleeve 202. The wear pads may be nylon wear pads or the like and may be configured to enhance the telescopically extendable sliding action of the jib 204 within the sleeve 202. In accordance with various embodiments, the jib sleeve 202 may further define a longitudinal cutout portion, or slot, 300 that may extend longitudinally from a point proximate the first end 210 of the hoist arm assembly 104 to a point proximate the second end 212 of the hoist arm assembly 104. The longitudinal slot 300 preferably acts as a channel, or guide, for a locking lug 302 of the locking assembly 112, as discussed in more detail below.

As noted above, hoist arm assembly 104 may be analogous to hoist arm assembly 14 in some respects. Thus, it is preferred that jib 204 of hoist arm assembly 104 be operative to move between retracted and extended positions analogous to positions 40 and 42 shown in FIG. 1. Accordingly, in some embodiments, a rod-type linear actuator analogous to hydraulic cylinder assembly 38 may be operably connected between sleeve 202 and jib 204. In some embodiments, the actuator may be actuated via hydraulic fluid, though any suitable fluid or electric actuator may be used.

As described in greater detail below, however, jib 204 of hoist arm assembly 104 differs from jib 28 of hoist arm assembly 14 in part by comprising a locking lug 302. In particular, leg 214 of jib 204 may translate within sleeve 202, as discussed herein. Locking lug 302 may preferably be operably coupled with the side of the leg 214 portion of jib 204 that faces locking assembly 112.

The hoist arm assembly 104 may further include one or more braces 208 operably coupled with one or more linear actuators 209 operative to pivot hoist mechanism 120. In the illustrated embodiment, hoist mechanism 120 comprises two linear actuators 209, and thus a pair of braces 208 is provided. (Only one linear actuator 209 is visible in FIG. 4 so that the components of hoist mechanism 120 may be better illustrated, whereas both linear actuators 209 are visible in FIGS. 5 and 6.) As with the linear actuator that may be provided in hoist arm assembly 104, linear actuators 209 may comprise any suitable fluid or electric actuator for pivoting hoist mechanism 120 and for loading a container on, unloading a container from, and transporting a container on a vehicle. In a preferred embodiment, linear actuator 209 may be a hydraulically-actuated rod-type cylinder. In any event, each brace 208 includes an inner brace 230 and an outer brace 232. The inner brace 230 may be operably coupled to an outer surface of the jib sleeve 202. Thus, as shown, each inner brace 230 of the pair of braces 208 may be operably coupled to opposing outer surfaces of the jib sleeve 202. The outer brace 232 may be operably coupled to the inner brace 230 by a plate 234 and a box channel 236 welded or otherwise operably coupled therebetween. Accordingly, each pair of braces 208 and the jib sleeve 202 may pivot as a unit about the one or more pivotal mounts 108. Furthermore, an actuator mounting pin 240 may be mounted or operably coupled at and between each pair of braces 208.

The actuators 209 are preferably pivotally mounted or otherwise operably coupled to the cylinder mounting pins 240 for causing pivotal movement of the hoist arm assembly 104 alone or, when locked to tail frame 106 as described below, as a unit with tail frame 106. More particularly, it should be understood from the discussion of FIGS. 1-3 above that the extension of the actuators 209 will cause the hoist arm assembly 104 and tail frame 106, when locked together, to pivot as a unit about the one or more sub-frame pivotal mounts 110. In this case, the actuators 209 may serve to move the hoist mechanism 120 between a lowered position similar to that shown in solid lines in FIG. 1 (e.g., substantially horizontal with the sub-frame 102 for transporting a container) and an elevated position similar to that shown in FIG. 2 (e.g., for dumping of the container 48). Similarly, it will be appreciated that when hoist arm assembly 104 and tail frame 106 are not locked together, extension of actuators 209 will cause hoist arm assembly 104 to pivot about pivotal mounts 108, similar to the illustrations in solid and dotted lines in FIG. 1 of hoist arm assembly 14. Again, this movement may allow an operator of hoist mechanism 120 to load a container onto a vehicle and to unload a container from a vehicle.

As noted above, hoist mechanism 120 may further include a locking assembly 112 that is configured to allow hoist arm assembly 104 to move between a locked position relative to tail frame 106 and an unlocked position relative to tail frame 106. In the locked position, the locking assembly 112 ensures the hoist arm assembly 104 and the tail frame 106 remain locked together when the hoist mechanism 120 is in the elevated position, thereby preventing collapse of the hook hoist and/or a container engaged therewith. According to one embodiment, in FIGS. 4 and 6, locking assembly 112 is in the unlocked position, and in FIG. 5, locking assembly 112 is in the locked position. In general, the locking assembly 112 may include a locking link arm 304 and a locking lug 302. As discussed below, translation of jib 204 within sleeve 202 preferably causes locking assembly 112 to move between locked and unlocked positions.

More particularly, and as noted above, jib sleeve 202 defines a longitudinal slot 300, and a locking lug 302 may be operably coupled to the leg 214 of jib 204. The longitudinal slot 300 may be defined so that the locking lug 302 may move along the longitudinal slot 300 away from second end 212 of hoist arm assembly 104 toward the first end 210 as the jib 204 moves from a retracted position to an extended position via the actuator provided in hoist arm assembly 104. Those of skill in the art will appreciate that the dimensions of longitudinal slot 300 may depend, among other things, on the length of travel of jib 204 within sleeve 202, the size and shape of locking lug 302, and the needed or desired lifting capacity of hoist mechanism 120 or the size and weight of the containers with which it will be used.

In one embodiment, the locking link arm 304 may be operably coupled to one of the cross-members 122 of the tail frame 106 and the one or more jib pivotal mounts 108 of the hoist arm assembly 104. In other words, in one embodiment, the cross-members 122 and the one or more jib pivotal mounts 108 pass through a frame of the locking link arm 304 to cause the locking link arm 304 to pivot with the tail frame 106 when hoist arm assembly 104 is locked with tail frame 106.

When locking assembly 112 is locked, the locking link arm 304 may be parallel to and flush with the jib sleeve 202. In this regard, the locking link arm 304 preferably defines a cutout or slot 306 extending longitudinally along the length of the locking link arm 304. Slot 306 is preferably similar in dimension to slot 300 and sized to permit translation of locking lug 302 therealong. Thus, when hoist arm assembly 104 and link arm 304 are positioned adjacent one another, slots 300 and 306 are preferably substantially in alignment, and locking lug 302 can move within both slots when it is desired to lock hoist arm assembly 104 with tail frame 106.

Slot 306 preferably has a closed end 308 defined proximate the distal end of link arm 304 and an open end 310 defined at a proximal end of link arm 304 (e.g., proximate second end 212 of hoist arm assembly 104). Further, locking lug 302 may comprise a head 312 coupled with a shaft 314. Preferably, as best seen in FIG. 5, shaft 314 may be sized to move unimpeded within both of slots 300 and 306, while head 312 may have a dimension greater than the width of slots 300 and 306. The position of open end 310 is defined such that, when hoist arm assembly 104 is in the lowered position such that it and link arm 304 are positioned adjacent one another, and when jib 204 is in a fully retracted position, locking lug 302 is proximate open end 310. Although head 312 is preferably dimensioned to be larger than the widths of slots 300 and 306, open end 310 allows shaft 314 of locking lug 302 to move into and out of slot 306. Correspondingly, when locking assembly 112 is moved to the locked position, the size of head 312 prevents lug 302 from exiting slot 306 and, thus, it prevents link arm 304 from disconnecting with hoist arm assembly 104.

In use, depending on the desired function to be performed with hoist mechanism 120, an operator of hoist mechanism 120 can decide whether to move locking assembly 112 to a locked position, such that hoist arm assembly 104 and tail frame 106 pivot together, or to move locking assembly 112 to an unlocked position, such that hoist arm assembly 104 pivots alone about pivotal mounts 108. For instance, when a container is not yet loaded on a vehicle, the hoist arm assembly 104 may be in the lowered position shown in FIG. 1, and jib 204 may be in the fully retracted position. To load the container onto the vehicle, an operator may cause actuators 209 to extend, which causes hoist arm assembly 104 to pivot alone about pivotal mounts 108 because, when jib 204 is in the fully retracted position, locking lug 302 is not within slot 306 and head 312 does not engage with link arm 304. Once the hoist arm assembly is engaged with the container, the operator may retract actuators 209, lifting the container onto the vehicle sub-frame or chassis and returning hoist arm assembly 104 to the lowered position.

As noted above, the operator may also extend jib 204 when the hoist arm assembly 104 is in the lowered position to move the container to a desired position for transport. Notably, in doing so, the locking assembly 112 may "self-lock," or automatically move to the locked position, because locking lug 302 will move through open end 310 of slot 306 some distance toward closed end 308. Thus, when it is desired to empty the container on the vehicle (e.g., by moving the hoist mechanism 120 to the elevated position shown in FIG. 2), the hoist arm assembly 104 is already locked with tail frame 106. Because of the engagement between head 312 of locking lug 302 and slot 306 of link arm 304 described above, locking assembly 112 prevents collapse of tail frame 106, hoist arm assembly 104, and/or the container being dumped. Furthermore, the operator may continue to extend jib 204 even when locking assembly 112 is in the locked position, at least until locking lug 302 reaches closed end 308 of slot 306, without risk of locking assembly 112 moving to an unlocked position. After dumping, the operator may cause actuators 209 to retract, thereby lowering hoist mechanism 120 to the lowered position shown in FIG. 1.

To unload the container from the vehicle, the operator may first cause jib 204 to move to the fully retracted position. This causes locking assembly 112 to move to the unlocked position. The operator may then cause actuators to extend, again causing hoist arm assembly 104 to pivot with respect to tail frame 106 about pivotal mounts 108. This allows the container to be unloaded onto the ground or onto a loading dock or the like. Further, it is noted that the locking assembly 112 according to embodiments of the present invention permits extension of the jib 204 from its fully retracted position when actuators 209 are extended. Thus, enhanced manipulation of a container during the unloading process is possible.

Based on the foregoing, exemplary embodiments of the present invention provide a hoist mechanism for loading a container onto a vehicle, unloading the container from the vehicle, transporting the container, and dumping the container, wherein the hoist mechanism has an improved locking assembly. As disclosed herein, the locking assembly has fewer parts than prior art locking assemblies, is easier and cheaper to manufacture, requires less service and maintenance, and is less prone to failure. Further, it enhances safety during dumping of a container.

According to other embodiments, additional optional structures and/or features may be included or the structures/features described above may be modified or augmented. Each of the additional features, structures, modifications, or augmentations may be practiced in combination with the structures/features above and/or in combination with each other. Thus, some, all or none of the additional features, structures, modifications or augmentations may be utilized in some embodiments. Some example additional optional features, structures, modifications, or augmentations are described below. For example, it is contemplated that locking lug 302 may be coupled with link arm 304, rather than jib 204, in some embodiments, and jib 204 may instead define one or more corresponding apertures configured to engage with lug 302, depending on the position of jib 204 within sleeve 202. Further, rather than a longitudinal slot 306 defined in link arm 304, in yet other embodiments link arm 304 may define a plurality of spaced apertures configured to engage with lug 302 in a manner similar to that described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A hoist mechanism, comprising:
   a mounting structure;
   a frame comprising a first end and a second end, the frame pivotably coupled with the mounting structure at the frame first end;
   a hoist arm assembly, the hoist arm assembly comprising a sleeve pivotably coupled with the frame second end and a jib coupled with the sleeve, the jib operative to move between an extended position and a retracted position with respect to the sleeve; and
   a locking assembly operative to move between an unlocked position, wherein the hoist arm assembly is pivotable with respect to the frame about the pivotal connection between the frame second end and the hoist arm assembly, and a locked position, wherein the frame and the hoist arm assembly are releasably coupled for unitary pivotal movement about the pivotal connection between the frame first end and the mounting structure, the locking assembly comprising:
   a lug disposed on the jib of the hoist arm assembly, the lug operative to move with the jib between the extended and retracted positions; and
   a link arm coupled with the frame, the link arm defining a first slot operative to engage with the lug when the jib is moved from the retracted position.

2. The hoist mechanism of claim 1, wherein the hoist mechanism is coupled with a vehicle.

3. The hoist mechanism of claim 2, wherein the mounting structure is a sub-frame of the vehicle.

4. The hoist mechanism of claim 1, further comprising at least one first linear actuator coupled between the mounting structure and the hoist arm assembly, wherein the at least one first linear actuator is operative to pivot the hoist arm assembly with respect to the frame when the locking assembly is in the unlocked position, and wherein the at least one first linear actuator is operative to pivot the hoist arm assembly and the frame together when the locking assembly is in the locked position.

5. The hoist mechanism of claim 4, further comprising a hook coupled with a distal end of the jib operative to engage a transportable container.

6. The hoist mechanism of claim 4, wherein the at least one first linear actuator is a rod-type hydraulic cylinder.

7. The hoist mechanism of claim 4, wherein the hoist arm assembly comprises a second linear actuator coupled between the sleeve and the jib, the second linear actuator operative to move the jib between the extended position and the retracted position with respect to the sleeve.

8. The hoist mechanism of claim 1, wherein the sleeve defines a second slot and wherein the lug travels within the second slot as the jib moves between the extended and retracted positions.

9. The hoist mechanism of claim 8, wherein the first slot has an open end and a closed end.

10. The hoist mechanism of claim 9, wherein when the locking assembly is moved from the unlocked position to the locked position, the lug moves past the first slot open end toward the first slot closed end.

11. The hoist mechanism of claim 8, wherein the lug comprises a shaft coupled with the jib and a head disposed on the shaft, wherein the head is larger than the width of the first and second slots.

12. The hoist mechanism of claim 11, wherein, when the locking assembly is in the locked position, the shaft of the lug extends through both the first and second slots and the head of the lug engages the link arm.

13. A hoist mechanism, comprising:
   a frame comprising a first end and a second end, the frame pivotably coupled with a mounting structure at the frame first end;
   a hoist arm assembly pivotably coupled with the frame second end, the hoist arm assembly comprising a jib operative to move between an extended position and a retracted position; and
   a locking assembly, comprising:
   a lug disposed on the jib of the hoist arm assembly; and
   a link arm coupled with the frame, the link arm defining a first slot dimensioned to selectively engage with the lug when the jib is moved from the retracted position;

wherein the hoist arm assembly is pivotable with respect to the frame when the jib is in the retracted position, and the frame and the hoist arm assembly are pivotable together when the jib is in the extended position.

14. The hoist mechanism of claim 13, wherein the hoist mechanism is a hook hoist.

15. The hoist mechanism of claim 14, wherein the mounting structure is a vehicle sub-frame.

16. The hoist mechanism of claim 13, wherein the hoist arm assembly further comprises a sleeve and the jib is disposed within the sleeve.

17. The hoist mechanism of claim 16, wherein the sleeve defines a second slot, and the lug translates along the second slot as the jib is moved between the extended and retracted positions.

18. The hoist mechanism of claim 13, wherein the lug defines a head that is larger than the width of the first slot.

19. The hoist mechanism of claim 18, wherein the head of the lug engages the link arm when the jib is in the extended position.

20. The hoist mechanism of claim 13, further comprising at least one linear actuator coupled between the mounting structure and the hoist arm assembly.

* * * * *